United States Patent
Singh et al.

(10) Patent No.: US 9,803,510 B2
(45) Date of Patent: Oct. 31, 2017

(54) AUTONOMOUS SELF-POWERED SYSTEM FOR REMOVING THERMAL ENERGY FROM POOLS OF LIQUID HEATED BY RADIOACTIVE MATERIALS, AND METHOD OF THE SAME

(75) Inventors: Krishna P. Singh, Hobe Sound, FL (US); Indresh Rampall, Cherry Hill, NJ (US); Joseph Rajkumar, Marlton, NJ (US)

(73) Assignee: HOLTEC INTERNATIONAL

( * ) Notice: Subject to any disclaimer, the term of this patent is extended or adjusted under 35 U.S.C. 154(b) by 438 days.

(21) Appl. No.: 13/450,150

(22) Filed: Apr. 18, 2012

(65) Prior Publication Data

US 2012/0294737 A1  Nov. 22, 2012

Related U.S. Application Data

(60) Provisional application No. 61/476,624, filed on Apr. 18, 2011.

(51) Int. Cl.
*F04B 35/04* (2006.01)
*F01K 25/08* (2006.01)
(Continued)

(52) U.S. Cl.
CPC ............ *F01K 25/08* (2013.01); *F22B 1/162* (2013.01); *F28B 1/06* (2013.01); *F28D 7/1607* (2013.01);
(Continued)

(58) Field of Classification Search
USPC .......... 417/410.1; 165/104.21; 376/272, 298, 376/268, 299; 202/185.3
See application file for complete search history.

(56) References Cited

U.S. PATENT DOCUMENTS 2,518,760 A * 8/1950 Dieter ........................... 165/122
3,341,424 A   9/1967 Schlicht et al.
(Continued)

FOREIGN PATENT DOCUMENTS

DE    2913520    10/1980
EP    0476563     3/1992
(Continued)

OTHER PUBLICATIONS

DE 2913520 A1 Abstract and Desription Machine Translation.*

*Primary Examiner* — Mark Laurenzi
*Assistant Examiner* — Shafiq Mian
(74) *Attorney, Agent, or Firm* — The Belles Group, P.C.

(57) ABSTRACT

An autonomous self-powered system for cooling radioactive materials comprising: a pool of liquid; a closed-loop fluid circuit comprising a working fluid having a boiling temperature that is less than a boiling temperature of the liquid of the pool, the closed-loop fluid circuit comprising, in operable fluid coupling, an evaporative heat exchanger at least partially immersed in the liquid of the pool, a turbo-generator, and a condenser; one or more forced flow units operably coupled to the closed-loop fluid circuit to induce flow of the working fluid through the closed-loop fluid circuit; and the closed-loop fluid circuit converting thermal energy extracted from the liquid of the pool into electrical energy in accordance with the Rankine Cycle, the electrical energy powering the one or more forced flow units.

18 Claims, 6 Drawing Sheets

(51) Int. Cl.
   *F28B 1/06*   (2006.01)
   *F28D 7/16*   (2006.01)
   *F28D 15/02*  (2006.01)
   *F28F 1/16*   (2006.01)
   *G21C 19/08*  (2006.01)
   *G21C 15/243* (2006.01)
   *F22B 1/16*   (2006.01)
   *F28D 21/00*  (2006.01)
   *G21C 19/07*  (2006.01)
   *G21C 15/18*  (2006.01)

(52) U.S. Cl.
   CPC ....... *F28D 7/1669* (2013.01); *F28D 15/0266* (2013.01); *F28F 1/16* (2013.01); *G21C 15/243* (2013.01); *G21C 19/08* (2013.01); *F28D 2021/0031* (2013.01); *F28D 2021/0064* (2013.01); *G21C 19/07* (2013.01); *G21C 2015/185* (2013.01); *Y02E 30/40* (2013.01)

(56) References Cited

U.S. PATENT DOCUMENTS

| | | | |
|---|---|---|---|
| 3,776,302 A | 12/1973 | Waszink et al. | |
| 3,984,282 A | 10/1976 | Kleimola | |
| 4,427,053 A * | 1/1984 | Klaren | 165/104.16 |
| 4,473,528 A | 9/1984 | Kleimola | |
| 4,478,784 A | 10/1984 | Burelbach | |
| 4,668,467 A | 5/1987 | Miler et al. | |
| 4,678,626 A | 7/1987 | Germer | |
| 4,687,626 A | 8/1987 | Tong | |
| 4,753,771 A | 6/1988 | Conway et al. | |
| 4,765,946 A | 8/1988 | Dagard et al. | |
| 4,818,475 A | 4/1989 | Gluntz et al. | |
| 4,998,509 A | 3/1991 | Gou et al. | |
| 5,076,999 A | 12/1991 | Forsberg | |
| 5,268,942 A * | 12/1993 | Newton et al. | 376/272 |
| 5,507,340 A * | 4/1996 | Alston | F28D 1/0477 165/150 |
| 5,612,982 A | 3/1997 | Woodcock et al. | |
| 5,661,770 A | 8/1997 | Spinks | |
| 5,694,442 A | 12/1997 | Cinotti et al. | |
| 5,761,262 A | 6/1998 | No et al. | |
| 5,887,043 A | 3/1999 | Spinks | |
| 5,955,041 A * | 9/1999 | Arnold et al. | 422/198 |
| 6,069,930 A | 5/2000 | Gamble et al. | |
| 6,243,432 B1 | 6/2001 | Cheung et al. | |
| 6,618,461 B2 | 9/2003 | Cheung et al. | |
| 6,751,959 B1 * | 6/2004 | McClanahan et al. | 60/670 |
| 6,795,518 B1 | 9/2004 | Conway et al. | |
| 6,839,396 B2 | 1/2005 | Willschuetz | |
| 6,865,244 B2 | 3/2005 | Meseth | |
| 7,245,688 B2 | 7/2007 | Nicholls et al. | |
| 7,549,850 B2 * | 6/2009 | Trapalis | 418/59 |
| 2002/0101951 A1 | 8/2002 | Nakamaru et al. | |
| 2004/0196948 A1 | 10/2004 | Conway et al. | |
| 2005/0120715 A1 | 6/2005 | Labrador | |
| 2005/0135544 A1 | 6/2005 | Eoh et al. | |
| 2005/0183421 A1 * | 8/2005 | Vaynberg | F01K 25/08 60/641.8 |
| 2007/0092053 A1 | 4/2007 | Sato | |
| 2007/0204623 A1 | 9/2007 | Rollins, III | |
| 2007/0245737 A1 * | 10/2007 | Inaba et al. | 60/670 |
| 2007/0253520 A1 | 11/2007 | Sim et al. | |
| 2008/0219397 A1 | 9/2008 | Sim et al. | |
| 2008/0310576 A1 | 12/2008 | Brisson et al. | |
| 2009/0067565 A1 | 3/2009 | Eckardt et al. | |
| 2009/0077971 A1 | 3/2009 | Schu | |
| 2009/0120091 A1 | 5/2009 | DuBois | |
| 2009/0129530 A1 * | 5/2009 | Reyes et al. | 376/282 |
| 2009/0180939 A1 | 7/2009 | Hagen et al. | |
| 2009/0323884 A1 | 12/2009 | Sato et al. | |
| 2010/0006276 A1 * | 1/2010 | Cremaschi | B21D 53/085 165/175 |
| 2011/0094257 A1 * | 4/2011 | Rusignuolo | F28D 1/0443 62/498 |
| 2011/0100593 A1 * | 5/2011 | Benz | F28B 1/06 165/59 |
| 2011/0158371 A1 | 6/2011 | Sato et al. | |

FOREIGN PATENT DOCUMENTS

| | | |
|---|---|---|
| GB | 527194 | 10/1940 |
| KR | 20090021722 | 3/2009 |
| KR | 20090102079 | 9/2009 |
| UA | 81419 | 1/2008 |

* cited by examiner

AUTONOMOUS SELF-POWERED SYSTEM FOR REMOVING THERMAL ENERGY FROM POOLS OF LIQUID HEATED BY RADIOACTIVE MATERIALS, AND METHOD OF THE SAME

CROSS-REFERENCE TO RELATED PATENT APPLICATIONS

This application claims the benefit of U.S. Provisional Patent Application No. 61/476,624, filed Apr. 18, 2011, the entirety of which is incorporated herein by reference.

FIELD OF THE INVENTION

The present invention relates generally to systems and methods of removing thermal energy from pools of liquid, and specifically to systems and methods of removing thermal energy from spent nuclear fuel pools that are self-powered and autonomous.

BACKGROUND OF THE INVENTION

The spent fuel pool (SFP) in a nuclear power plant serves to store used spent nuclear fuel discharged from the reactor in a deep pool (approximately 40 feet deep) of water. In existing systems, the decay heat produced by the spent nuclear fuel is removed from the SFP by circulating the pool water through a heat exchanger (referred to as the Fuel Pool Cooler) using a hydraulic pump. In the Fuel Pool Cooler, the pool water rejects heat to a cooling medium which is circulated using another set of pumps. Subsequent to ifs cooling in the Fuel Pool cooler, the pool water is also purified by passing it through a bed of demineralizers before returning it to the pool.

In existing systems, the satisfactory performance of the spent fuel cooling and clean up system described above is critically dependent on pumps which require electric energy to operate. As the events at the Fukushima Dai-ichi showed, even a redundant source of power such as Diesel generators cannot preclude the paralysis of the classical fuel pool cooling system.

In order to insure that the decay heat produced by the fuel stored in the SFP is unconditionally rejected to the environment, the present invention introduces a heat removal system and method that does not require an external source of electric energy or equipment that can be rendered ineffective by an extreme environmental phenomenon such as a tsunami, hurricane, earthquake and the like.

BRIEF SUMMARY OF THE INVENTION

These, and other drawbacks, are remedied by the present invention. An autonomous and self-powered system of cooling a pool of liquid in which radioactive materials are immersed is presented. The inventive system utilizes a closed-loop fluid circuit through which a low boiling point working fluid flows. The closed-loop fluid circuit of the inventive system, in accordance with the Rankine Cycle: (1) extracts thermal energy from the liquid of the pool into the working fluid; (2) converts a first portion of the extracted thermal energy into electrical energy that is used to power one or more forced flow units that induce flow of the working fluid through the closed-loop fluid circuit; and (3) transfers a second portion of the extracted thermal energy to a secondary fluid, such as air. In this way, the inventive system operates without the need for any electrical energy other than that which is generates internally in accordance with the Rankine Cycle.

In one embodiment, the invention can be an autonomous self-powered system for cooling radioactive materials, the system comprising: a pool of liquid, the radioactive materials immersed in the pool of liquid; a closed-loop fluid circuit comprising a working fluid having a boiling temperature that is less than a boiling temperature of the liquid of the pool, the closed-loop fluid circuit comprising, in operable fluid coupling, an evaporative heat exchanger at least partially immersed in the liquid of the pool, a turbogenerator, and a condenser; one or more forced flow units operably coupled to the closed-loop fluid circuit to induce flow of the working fluid through the closed-loop fluid circuit; and the closed-loop fluid circuit converting thermal energy extracted from the liquid of the pool into electrical energy in accordance with the Rankine Cycle, the electrical energy powering the one or more forced flow units.

In another embodiment, the invention can be an autonomous self-powered system for cooling a pool of liquid comprising: a closed-loop fluid circuit comprising a working fluid having a boiling temperature that is less than a boiling temperature of the liquid of the pool, the closed-loop fluid circuit comprising, in operable fluid coupling, an evaporative heat exchanger at least partially immersed in the liquid of the pool, a turbogenerator, and a condenser; one or more forced flow units operably coupled to the closed-loop fluid circuit to induce flow of the working fluid through the closed-loop fluid circuit; and the closed-loop fluid circuit converting thermal energy extracted from the liquid of the pool into electrical energy in accordance with the Rankine Cycle, the electrical energy powering the one or more forced flow units.

In yet another embodiment, the invention can be a method of cooling a pool of liquid comprising: flowing the working fluid having a boiling temperature that is less than a boiling temperature of the liquid of the pool through a closed-loop fluid circuit that, in accordance with a Rankine Cycle: (1) extracts thermal energy from the liquid of the pool into the working fluid; (2) converts a first portion of the extracted thermal energy into electrical energy that is used to power one or more forced flow units that induce flow of the working fluid through the closed-loop fluid circuit; and (3) transfers a second portion of the extracted thermal energy to a secondary fluid.

In a yet further aspect, the invention can be a vertical evaporative heat exchanger for immersion in a heated fluid comprising: a tubeside fluid circuit comprising: a top header; a bottom header; a core tube forming a downcomer passageway between the top header and the bottom header, the core tube having a first effective coefficient of thermal conductivity; a plurality of heat exchange tubes forming passageways between the bottom header and the top header, the plurality of the heat exchange tubes having a second effective coefficient of thermal conductivity that is greater than the first effective coefficient of thermal conductivity; a working fluid in the tubeside fluid circuit; an inlet for introducing a liquid phase of the working fluid into the tubeside fluid circuit; an outlet for allowing a vapor phase of the working fluid to exit the top header; and wherein transfer of heat from the heated fluid to the working fluid induces a thermosiphon flow of the liquid phase of the working fluid within the tubeside fluid circuit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE DRAWINGS

The following description of the preferred embodiment(s) is merely exemplary in nature and is in no way intended to limit the invention, its application, or uses. While the invention is exemplified in FIGS. 1-6 as being used to cool pools of liquid in which radioactive materials are immersed (such as spent nuclear fuel, high level radioactive waste or low level radioactive waste), the invention is not so limited and can be used to cool any body of liquid in need of cooling.

Figure 1:
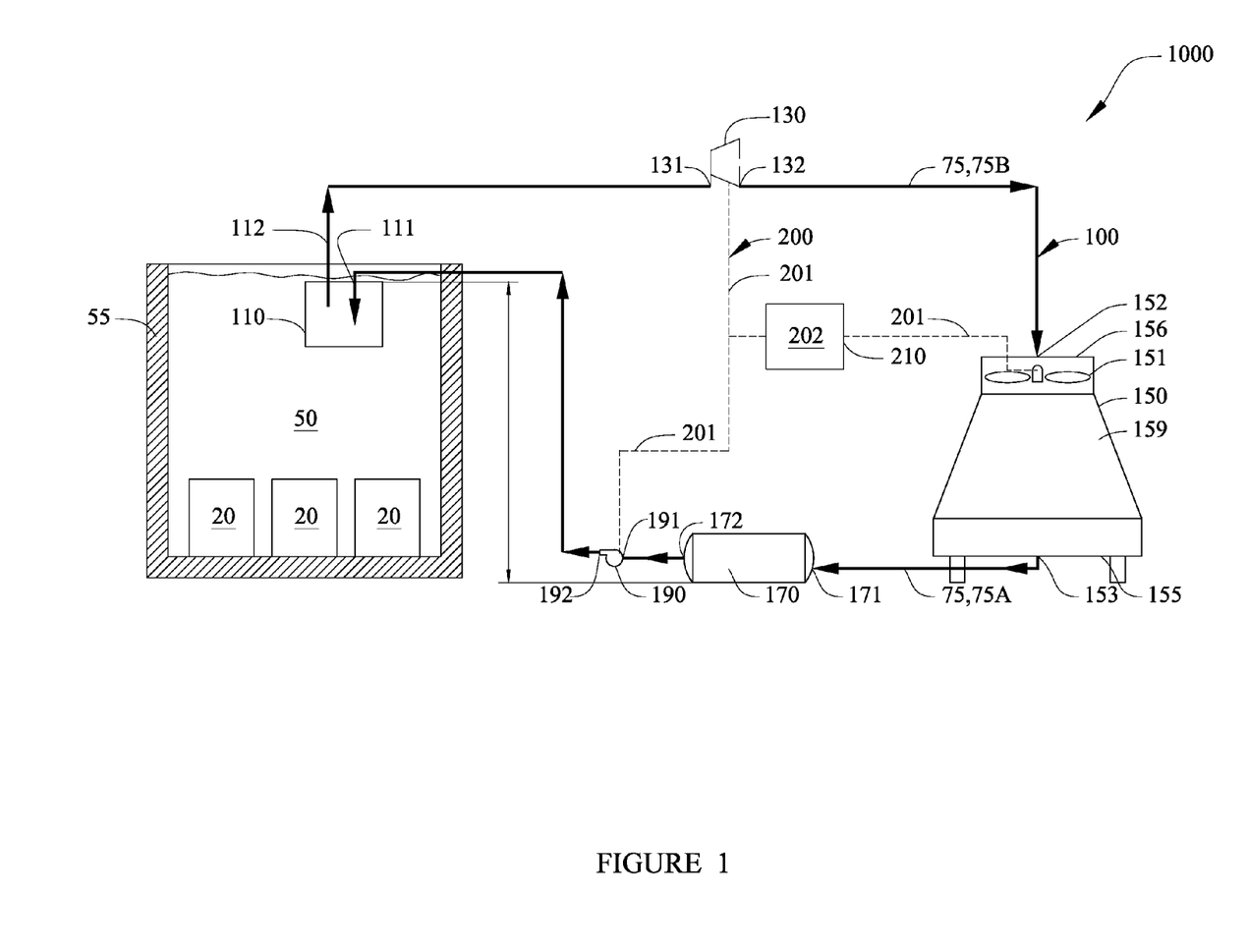
FIG. 1 is a schematic of an autonomous self-powered cooling system according to one embodiment of the present invention.

Referring first to FIG. 1, an autonomous self-powered cooling system 1000 according to an embodiment of the present invention is schematically illustrated. The autonomous self-powered cooling system 1000 generally comprises a closed-loop fluid circuit 100, an electrical circuit 200, and a pool of liquid 50. Radioactive materials 20 are immersed in the pool of liquid 50, which in the exemplified embodiment is a spent fuel pool. Radioactive materials 20, such as spent nuclear fuel, generate a substantial amount of heat for a considerable amount of time after completion of a useful cycle in a nuclear reactor. Thus, the radioactive materials 20 are immersed in the pool of liquid 50 to cool the radioactive materials 20 to temperatures suitable for dry storage. In embodiments where the radioactive materials 20 are spent nuclear fuel rods, said spent nuclear fuel rods will be supported in the pool of liquid 50 in fuel racks located at the bottom of the pool of liquid 50 and resting on the floor. Examples of suitable fuel racks are disclosed in United States Patent Application Publication No. 2008/0260088, entitled Apparatus and Method for Supporting Fuel Assemblies in an Underwater Environment Having Lateral Access Loading, published on Oct. 23, 2008, and United States Patent Application Publication No. 2009/0175404, entitled Apparatus or Supporting Radioactive Fuel Assemblies and Methods of Manufacturing the Same, published on Jul. 9, 2009, the entireties of which are hereby incorporated by reference.

As a result of being immersed in the pool of liquid 50, thermal energy from the radioactive materials 20 is transferred to the pool of liquid 50, thereby heating the pool of liquid 50 and cooling the radioactive materials. However, as the pool of liquid 50 heats up over time, thermal energy must be removed from the pool of liquid 50 to maintain the temperature of the pool of liquid 50 within an acceptable range so that adequate cooling of the radioactive materials 20 can be continued.

As discussed in greater detail below, the closed-loop fluid circuit 100 extends through the pool of liquid 50. A working fluid 75 is flowed through the closed-loop fluid circuit 100. The closed-loop fluid circuit 100 extracts thermal energy from the pool of liquid 50 (into the working fluid 75) and converts the extracted thermal energy into electrical energy. The electrical energy generated by said conversion powers the electrical circuit 200, which in turn powers forced flow units 190, 151 (described below) that induce flow of the working fluid 75 (FIG. 2) through the closed-loop circuit 100. The aforementioned extraction and conversion of thermal energy into electrical energy is accomplished by the closed-loop fluid circuit 100 in accordance with the Rankine Cycle. In certain specific embodiments, and depending on the identity of the liquid 50 to be cooled and the working fluid 75 being used, the closed-loop fluid circuit 100 can accomplish the extraction and conversion of thermal energy into electrical energy in accordance with the Organic Rankine Cycle.

In order to cool the pool of liquid 50 prior to the liquid 50 of the pool evaporating/boiling, the working fluid 75 is preferably a low boiling-point fluid (relative to the liquid 50 of the pool). More specifically, the working fluid 75 is selected so that it has a boiling temperature that is less than the boiling temperature of the liquid 50 of the pool. It is appreciated that the temperature at which a liquid boils/evaporates is dependent on pressure and that the liquid 50 of the pool and the working fluid 75 may be subject to different pressures in certain embodiments of the invention. Furthermore, as discussed in greater detail below, the working fluid 75 is evaporated/boiled in an evaporative heat exchanger 110 that is immersed in the pool of liquid 50. In certain such embodiments, the liquid 50 of the pool will be under a first pressure and the working fluid 75 in the evaporative heat exchanger 110 will be under a second pressure that is greater than first pressure. Thus, in such an embodiment, the working fluid 75 is selected so that the boiling temperature of the working fluid 75 at the second pressure is less than the boiling temperature of the liquid 50 of the pool at the first pressure. In one specific embodiment, the first pressure will be atmospheric pressure and the second pressure will be in a range of 250 psia to 400 psia.

In one embodiment, the liquid 50 of the pool is water. As used herein, the term "water" includes borated water, demineralized water and other forms of treated water or water with additives. Suitable working fluids 75 include, without limitation, refrigerants. Suitable refrigerants may include, without limitation, ammonia, sulfur dioxide, chlorofluorocarbons, hydrochlorofluorocarbons, hydrofluorocarbons, haloalkanes, and hydrocarbons. One particularly suitable refrigerant that can be used as the working fluid 75 is tetraflouroethane, commonly known as HFC-134a.

The exemplified embodiment of the closed-loop fluid circuit 100 generally comprise an evaporative heat exchanger 110, a turbogenerator 130, a condenser 150, a working fluid reservoir 170, and a hydraulic pump 190. The aforementioned components 110, 130, 150, 170, 190 of the closed-loop fluid circuit 100 are operably and fluidly coupled together using appropriate piping, joints and fittings as is well-known in the art to form a fluid-tight closed-loop through which the working fluid 75 can flow through in both a liquid phase 75A and a vapor phase 75B. The working fluid 75 is in the liquid phase 75A between a working fluid outlet 153 of the condenser 150 and a working fluid inlet 111 of the evaporative heat exchanger 110. The working fluid 75 is in the vapor phase 75B between a working fluid outlet 112 of the evaporative heal exchanger 110 and a working fluid inlet 152 of the condenser 150. As discussed in greater detail below, the evaporative heat exchanger 110, which is immersed in the liquid 50 of the pool, converts the working fluid 75 from the liquid phase 75A to the vapor phase 75B by transferring thermal energy from the liquid 50 of the pool into the working fluid 75. Conversely, the condenser 150 converts the working fluid 75 from the vapor phase 75B to the liquid phase 75A by transferring thermal energy from the working fluid 75 into a secondary fluid (which can be air that is rejected to the environment in certain embodiments).

Figure 6:
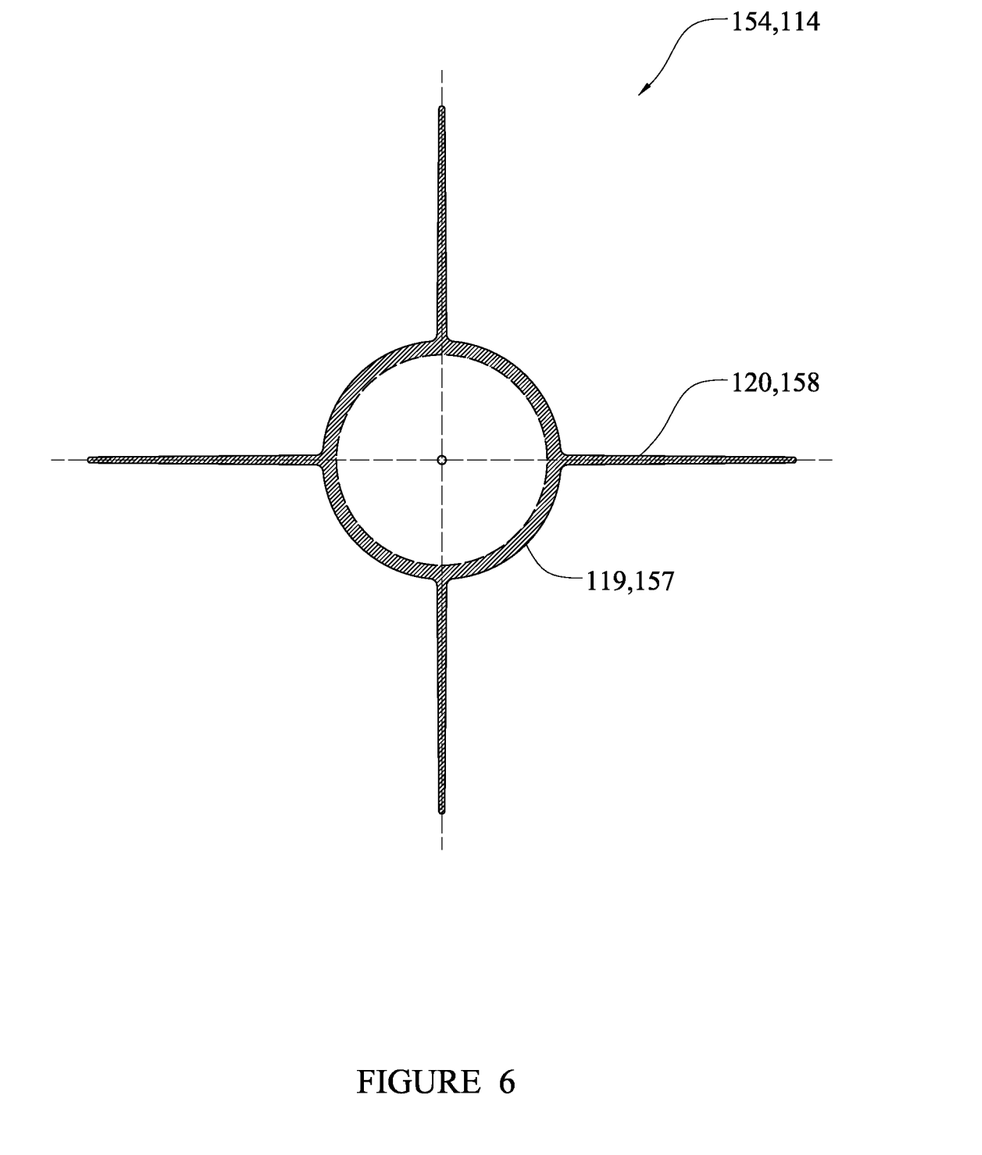
FIG. 6 is a transverse cross-section of finned heat exchange tube for use in the evaporative heat exchanger of FIG. 2 and/or the air cooled condensers of FIGS. 3 and 4.

In the exemplified embodiment, the autonomous self-powered system 1000 further comprises two forced flow units that induce flow of the working fluid 75 through the closed-loop fluid circuit 100, namely the hydraulic pump 190 (which is considered part of the closed-loop fluid circuit 100) and a blower 151 which, when operated, forces cooling air to flow over heat exchange tubes 154 (as shown in FIG. 6) of the condenser 150. The hydraulic pump 190 directly induces flow of the working fluid 75 through the closed-loop fluid circuit 100 by drawing the liquid-phase 75A of the working fluid 75 from the working fluid reservoir 170 and forcing the liquid-phase 75A of the working fluid 75 into the evaporative heat exchanger 110. The blower 151 indirectly induces flow of the working fluid 75 through the closed-loop fluid circuit 100 by increasing air flow over the heat exchange tubes 154 of the condenser 150 (the working fluid 75 being the tubeside fluid in the condenser 150), thereby increasing the extraction of thermal energy from the working fluid 75 in the condenser 150 and promoting increased condensation and a thermo-siphon flow effect of the working fluid 75. In certain embodiments of the invention, more or less forced flow units can be incorporated into the autonomous self-powered system 1000 as desired.

For example, in certain embodiments, the blower 151 may be omitted while, in certain other embodiments, the hydraulic pump 90 may be omitted. For example, if the condenser 150 were a natural draft air-cooled condenser (see FIGS. 4-5B), the blower 151 may be omitted. Furthermore, in certain embodiments where the condenser 150 is not an air cooled condenser, but is for example a shell and tube beat exchanger, a hydraulic pump that is used to force flow of the secondary fluid through the condenser 150 can be a forced flow unit.

Irrespective of the exact number and identity of the forced flow units that are used to induce flow of the of the working fluid 75 through the closed-loop fluid circuit 100, all of said forced flow units are powered only by electrical energy generated through the conversion of the thermal energy that is extracted from the liquid 50 of the pool. More specifically, in the exemplified embodiment, both the hydraulic pump 190 and the blower 151 are operably and electrically coupled to the electrical circuit 200, which is powered solely by the electrical energy generated by the turbogenerator 130 (discussed in greater detail below). Thus, the autonomous self-powered system 1000 can operate to cool the liquid 50 of the pool for an indefinite period of time and completely independent of any outside sources of electrical energy, other than that electrical energy that is generated through the conversion of the thermal energy extracted from the liquid 50 of the pool. Stated simply, the thermal energy of the liquid 50 of the pool is the sole source of energy required to drive the cooling system 1000.

Referring still to FIG. 1, the general operation cycle of the autonomous self-powered system 1000 will be described. The working fluid reservoir 170 stores an amount of the liquid phase 75a of the working fluid 75 to charge and control the quantity of the working fluid 75 in the thermal cycle at start up. The working fluid reservoir 170 also provides the means to evacuate the closed-loop fluid circuit 100 of air and to fill the closed-loop fluid circuit 100 with the required amount of the working fluid 75. In certain embodiments, the working fluid reservoir 170 is needed only at the beginning of the system operation (start up) to insure that the proper quantity of the working fluid 75 is injected into the thermal cycle.

The hydraulic pump 190 is located downstream of the working fluid reservoir 170 in the exemplified embodiment. However, in alternate embodiments, the hydraulic pump 190 can be located upstream of the working fluid reservoir 170. Once started, the hydraulic pump 190 draws the liquid phase 75A of the working fluid 75 from the working fluid reservoir 170, thereby drawing the liquid phase 75A of the working fluid 75 into the working fluid inlet 191 of the hydraulic pump 190. As the hydraulic pump 190 operates, the liquid phase 75A of the working fluid 75 is expelled from the working fluid outlet 192 of the hydraulic pump under pressure. The expelled liquid phase 75A of the working fluid 75 is forced into the evaporative heat exchanger 110 via the working fluid inlet 111 of the evaporative heat exchanger 110.

The evaporative heat exchanger 110 is at least partially immersed in the liquid 50 of the pool so that thermal energy from liquid 50 can be transferred to the working fluid 70 while in the evaporative heat exchanger 110. In the exemplified embodiment, the evaporative heat exchanger 110 is full immersed in the liquid 50 of the pool. Furthermore, the evaporative heat exchanger 110 is located at a top of the pool of liquid 50, which tends to be hotter than the bottom of the pool, of liquid 50 due to temperature differentials in the liquid 50 (hot fluids rise). In one embodiment, the evaporative heat exchanger 110 is mounted to one of the sidewalls 55 of the pool of liquid 50 so that the evaporative heat exchanger 110 does not interfere with loading and unloading operations that take place within the pool of liquid 50 for the radioactive materials 20.

Figure 2:
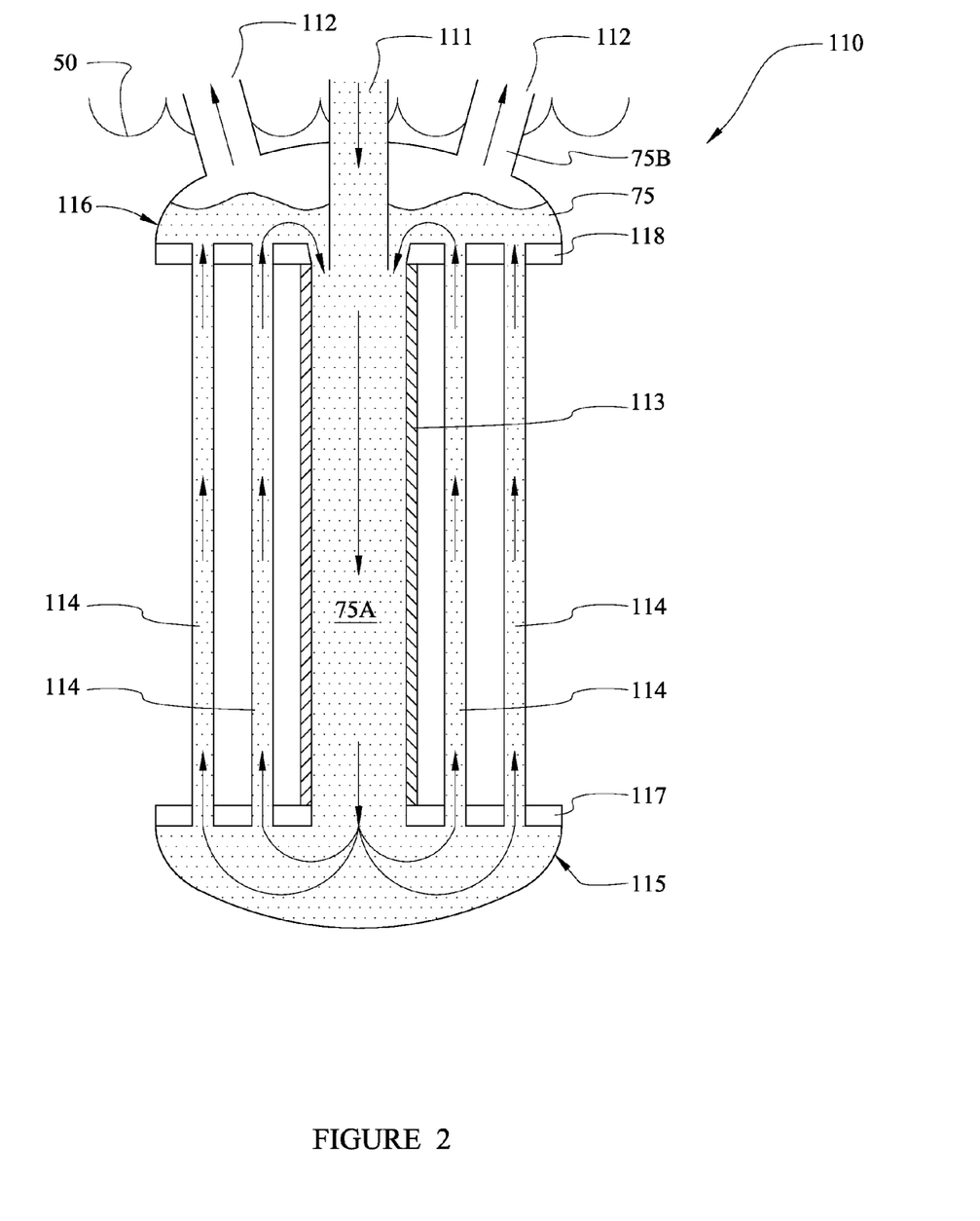
FIG. 2 is a schematic of an evaporative heat exchanger for use in the autonomous self-powered cooling system of FIG. 1.

The details of one embodiment of the evaporative heat exchanger 110, including the operation thereof, will now be described with reference to FIGS. 1 and 2 concurrently. Of course, the invention is not so limited, and the evaporative heat exchanger 110 can take on other structural embodiments in other embodiments of the invention. The evaporative heat exchanger 110 generally comprises a core tube 113 (which acts as a downcomer tube in the exemplified embodiment), a plurality of heat exchange tubes 114, a working fluid bottom header 115, and a working fluid top header 116, which collectively define a tubeside fluid circuit. The working fluid bottom header 115 comprises a bottom tube sheet 117 while the working fluid top header 116 comprises a top tube sheet 118.

In one embodiment, the bottom and top headers 115, 116 and the core pipe 113 are constructed of a corrosion resistant alloy, such as stainless steel. The bottom and top tube sheets are constructed of an aluminum clad stainless steel. The heat exchange tubes 114 are constructed of aluminum (as used herein the term "aluminum" includes aluminum alloys) and are welded to the aluminum cladding of the bottom and top tube sheets 117, 118 to make leak tight joints. The core pipe 113 will be welded to the stainless steel base metal of the bottom and top tube sheets 117, 118. Of course, other materials and construction methodologies can be used as would be known to those of skill in the art.

The core tube 113 extends from the working fluid outlet header 116 to the working fluid inlet header 115, thereby forming a fluid-tight path between the two through which the liquid phase 75A of the working fluid 75 will flow. More specifically, the core tube 113 is connected to the lower and upper tube sheets 117, 118 of the working fluid headers 115, 116. The working fluid inlet 111 extends into the core tube 113 and introduces cool liquid phase 75A of the working fluid 75 into a top portion of the core tube 113. The core tube 113 is formed of a material that has a low coefficient of thermal conductivity (as compared to the material of which the heat exchange tubes 114 are constructed), such as steel. The core tube 113 may also comprise a thermal insulating layer, which can be an insulating shroud tube, to minimize heating of the liquid phase 75A of the working fluid 75 in the core tube 113 by the liquid 50 of the pool. Irrespective of the materials and/or construction of the core tube 113, the core tube 113 has an effective coefficient of thermal conductivity (measured from an inner surface that is contact with the working fluid 75 to an outer surface that is in contact with the liquid 50 of the pool) that is less than the effective coefficient of thermal conductivity of the heat exchange tubes 114 (measured from an inner surface that is contact with the working fluid 75 to an outer surface that is in contact with the liquid 50 of the pool) in certain embodiments of the invention. As discussed in detail below, this helps achieve an internal thermosiphon recirculation flow of the liquid phase 75A of the working fluid 75 within the evaporative heat exchanger 110 itself (indicated by the flow arrows in FIG. 2).

The plurality of heat exchange tubes 114 form a tube bundle that circumferentially surrounds the core tube 113. The plurality of heat exchange tubes 114 are arranged in a substantially vertical orientation. The heat exchange tubes 114 are constructed of a material having a high coefficient of thermal conductivity to effectively transfer thermal energy from the liquid 50 of the pool to the working fluid 75. Suitable materials include, without limitation, aluminum, copper, or materials of similar thermal conductivity. In one embodiment, the heat exchange tubes 114 are fumed tubes comprising a tube portion 119 and a plurality of fins 120 extending from an outer surface of the tube portion 119 (shown in FIG. 6). In the exemplified embodiment, each heat exchange tube 114 comprises four fins 120 extending from the tube portion 119 at points of 90 degree circumferential separation.

During operation of the autonomous self-powered system 1000, cool liquid phase 75A of the working fluid 75 enters the evaporative heat exchanger 110 via the working fluid inlet 111 as discussed above. The liquid phase 75A of the working fluid 75 is considered "cool" at this time because it had been previously cooled in the condenser 50. As the cool liquid phase 75A of the working fluid 75 enters the evaporative heat exchanger 110, it is introduced into the core tube 113. The cool liquid phase 75A of the working fluid 75 flows downward through the core tube and into the bottom header 115, thereby filling the bottom header 115 and flowing upward into the plurality of heat exchange tubes 114. As the liquid phase 75A of the working fluid 75 flows upward in the plurality of heat exchange tubes 114, thermal energy from the liquid 50 of the pool that surrounds the plurality of heat exchange tubes 114 is conducted through the plurality of heat exchange tubes 114 and into the liquid phase 75A of the working fluid 75, thereby heating the liquid phase 75A of the working fluid 75. The warmed liquid phase 75A of the working fluid 75 then enters the top header 116 where it is drawn back into the core tube 113 by a thermosiphon effect. As a result, the liquid phase 75A of the working fluid 75 is recirculated back through the aforementioned cycle until the liquid phase 75A of the working fluid 75 achieves the boiling temperature of the working fluid 75, thereby being converted into the vapor phase 75B of the working fluid 75. The vapor phase 75B of the working fluid 75 rises within the evaporative heat exchanger 110 and gather within a top portion of the top header 116 where it then exits the evaporative heat exchanger 110 via the working fluid outlet(s) 112. The internal design of the evaporative heat exchanger 110 promotes recirculation of the working fluid 117 and separation of the vapor phase 75B from the liquid phase 75A in the top header 116 (as shown in FIG. 2).

As mentioned above, the evaporative heat exchanger 110 is pressurized to a supra-atmospheric pressure. In one embodiment, the pressure within the evaporative heat exchanger 110 is between 250 psia to 400 psia, with a more preferred range being between 280 psia and 320 psia, with approximately 300 psia being most preferred. Pressurization of the evaporative heat exchanger 110 is achieved through properly positioned valves as would be known to those of skill in the art. In one embodiment, the working fluid 75 and the pressure within the evaporative heat exchanger 110 are selected so that the working fluid evaporates at a temperature between 145° F. and 175° F., and more preferably between 155° F. and 165° F.

Referring solely now to FIG. 1, the pressurized vapor phase 75B of the working fluid 75 exits the working fluid outlet 112 of the evaporative heat exchanger 110 and enters the working fluid inlet 131 of the turbogenerator 130. The pressurized vapor phase 75B of the working fluid 75 produced in the evaporative heat exchanger 110 then serves to energize a suitably sized turbogenerator 130. In other words, the turbogenerator 130 converts a first portion of the thermal energy extracted from the liquid 50 of the pool (which is now in the form of kinetic energy (velocity head) and/or potential energy (pressure head) of the vapor flow) to electrical power, as would be understood by those of skill in the art. As used herein, the term "turbogenerator" includes a device and/or subsystem that includes a turbine and electrical generator either in directed or indirect connection. The term "turbogenerator" is intended to include any device and/or subsystem that can convert the pressurized vapor phase 75B of the working fluid 75 into electrical energy. As the vapor phase 75B of the working fluid 75 passes through the turbogenerator 130 it is partially depressurized as it exits the working fluid outlet 132 of the turbogenerator still in the vapor phase 75B. At this point, the vapor phase 75B of the working fluid 75 may be at a pressure between 200 psia and 270 psia.

As mentioned above, the forced flow units (which in the exemplified embodiment are the hydraulic pump 190 and the blower 151) are operably and electrically coupled to the turbogenerator 130 by the electrical circuit 130 via electrical lines 201. All of the forced flow units are powered solely by the electrical energy generated by the turbogenerator 130 as discussed above. Moreover, in many instances, the turbogenerator 130 will generate surplus electrical energy. Thus, the autonomous self-powered system 1000 may further comprise a rechargeable electrical energy source 202, such as a battery, operably and electrically coupled to the turbogenerator 130 by the electrical circuit 200. In certain embodiments, the rechargeable electrical energy source 202 will be operably coupled to a controller so that certain valves, sensors, and other electrical components can be operated even when the turbogenerator 130 is not running.

Referring still to FIG. 1, the partially depressurized vapor phase 75B of the working fluid 75 that exits the turbogenerator 130 enters the working fluid inlet 152 of the condenser 150. The condenser 150 transfers a sufficient amount of thermal energy from the partially depressurized vapor phase 75B of the working fluid 75 to a secondary fluid so that the depressurized vapor phase 75B of the working fluid 75 is converted back into the liquid phase 75A of the working fluid 75. The condensed liquid phase 75A of the working fluid 75 exits the condenser 150 via the working fluid outlet 153 of the condenser where it flows back into the working fluid reservoir 170 for recirculation through the closed-loop fluid circuit 100. In one embodiment, the condenser 150 is an air-cooled condenser and, thus, the secondary fluid is air that is expelled to the environment. In other embodiments, the condenser 150 can be any type of heat exchanger than can remove thermal energy from the partially depressurized vapor phase 75B of the working fluid 75, including without limitation, a shell and tube heat exchanger, a plate heat exchanger, a plate and shell heat exchanger, an adiabatic heat exchanger, a plate fin heat exchanger, and a pillow plate heat exchanger.

Figure 3:
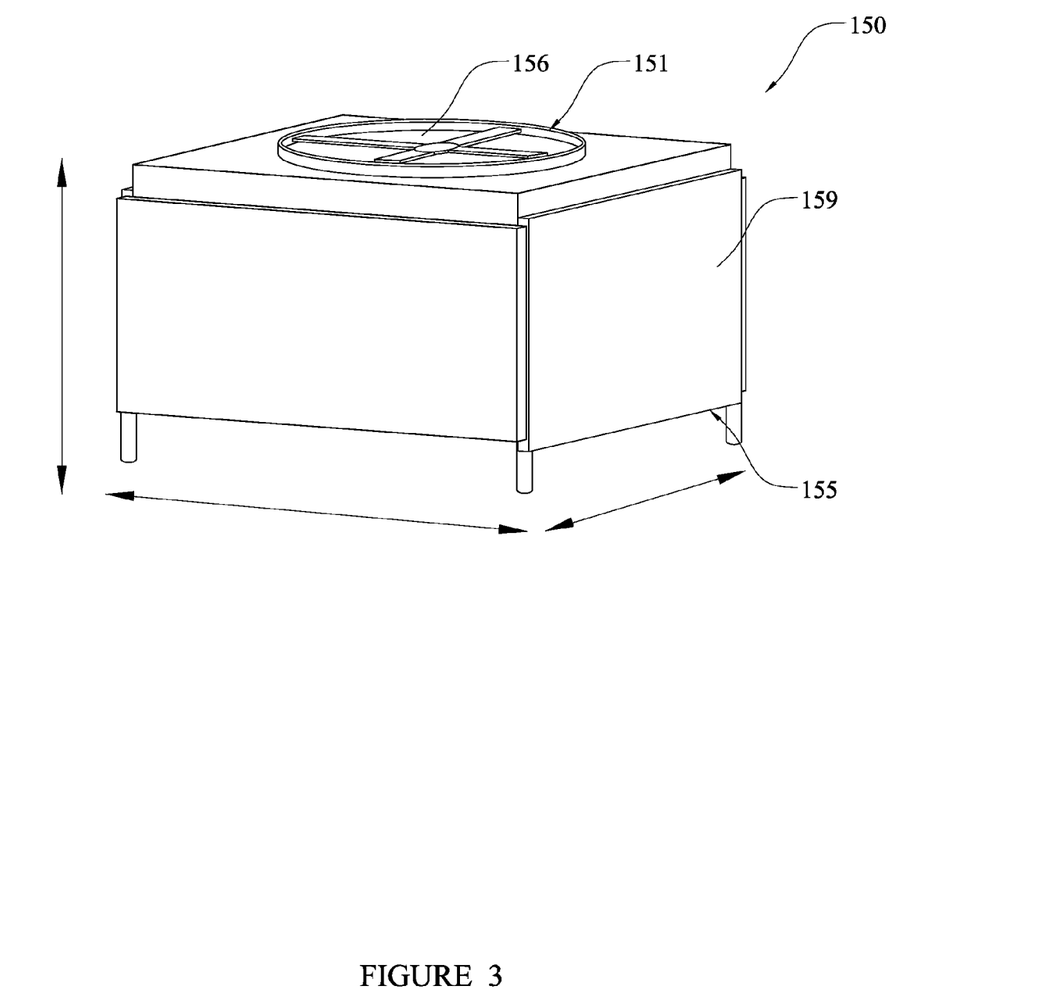
FIG. 3 is an induced air-flow air cooled condenser for use in the autonomous self-powered cooling system of FIG. 1.

Referring to FIGS. 1 and 3 concurrently, an example of induced flow air cooled-condenser 150 that can be used in the system 1000 is exemplified. The induced flow air cooled-condenser 150 comprises a plurality of heat exchange tubes 154 (FIG. 6) positioned within an internal cavity formed by a housing 159. The working fluid 75 is the tubeside fluid and flows through the plurality of heat exchange tubes 154. The plurality of heat exchange tubes 154 are arranged in a substantially vertical orientation and are finned as discussed above with respect to the heat exchange tubes 114 of the evaporative heat exchanger 110, and as shown in FIG. 6.

The induced flow air cooled-condenser 150 comprises a cool air inlet 155 and a warmed air outlet 156. The warmed air outlet 156 is at a higher elevation than the cool air inlet 155. The plurality of heat exchange tubes 154 are located in the cavity of the housing at an elevation between the elevation of the cool air inlet 155 and an elevation of the warmed air outlet 156. As such, in addition to the air flow within the housing 159 being forced by operation of the blower 151, which is located within the warmed air outlet 156, additional air flow will be achieved by the natural convective flow of the air as it is heated (i.e., the chimney effect). As warmed air exists the condenser 150 via the warmed air outlet 156, additional cool air is drawn into the cool air inlet 155. The induced flow air cooled-condenser 150, in certain embodiments, is located outside of the containment building in which the pool of liquid 50 is located.

Figure 4:
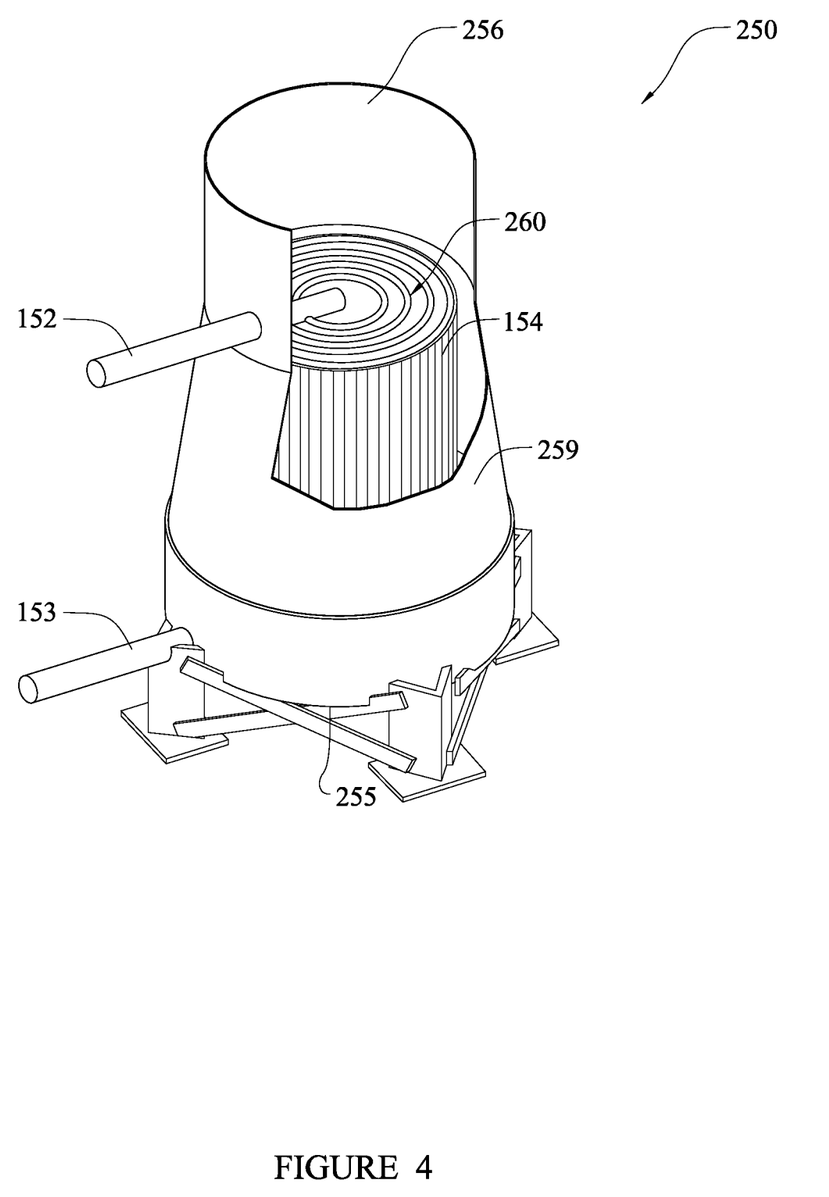
FIG. 4 is a natural draft air cooled condenser for use in the autonomous self-powered cooling system of FIG. 1.
Figure 5A:
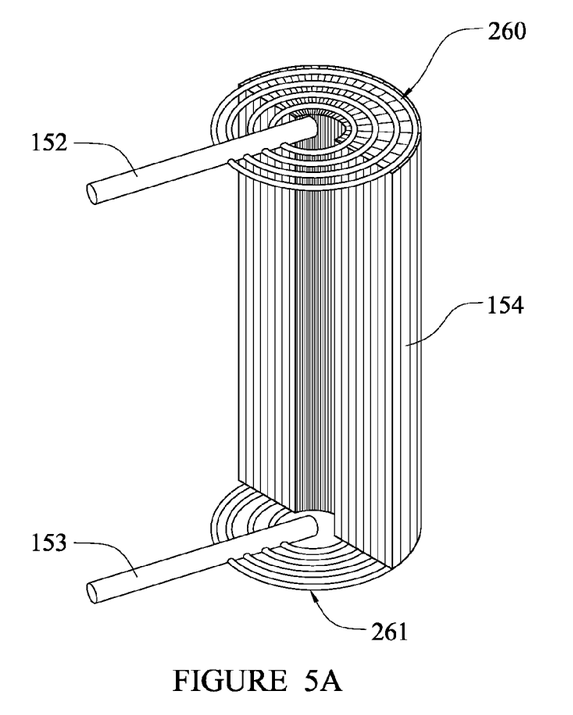
FIG. 5A is perspective view of the heat exchange tube bundle of the natural draft air cooled condenser of FIG. 4.
Figure 5B:
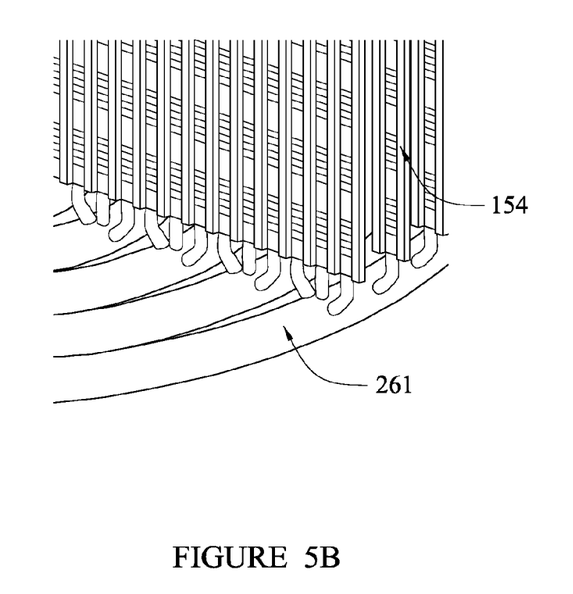
FIG. 5B is a close-up view of area V-V of FIG. 5A.

Referring now to FIGS. 4-5B concurrently, an example of natural draft air cooled-condenser 250 that can be used in the system 1000 is exemplified. Of note, the flow of air over the heat exchanger tubes 154 (which are also vertically oriented) is accomplished solely by natural convection (i.e., the chimney effect) and, thus, the blower 151 is not required. However, in certain embodiments, the blower 151 can be incorporated into the natural draft air cooled-condenser 250 as desired to accommodate for situations where the ambient air may reach elevated temperatures that could negatively affect adequate heat removal from the working fluid 75. Of further note, the natural draft air cooled-condenser 250 comprises a working fluid inlet header 260 comprising a plurality concentrically arranged toroidal tubes. Similarly, the natural draft air cooled-condenser 250 also comprises a working fluid outlet header 261 comprising a plurality concentrically arranged toroidal tubes. The plurality of heat exchange tubes 154 form a tube bundle that extends from the toroidal tubes of the working fluid inlet header 260 to the toroidal tubes of the working fluid outlet header 261.

As with the air-cooled condenser 150, the natural draft air cooled-condenser 250 comprises a cool air inlet 255 and a warmed air outlet 256. The warmed air outlet 256 is at a higher elevation than the cool air inlet 255. The plurality of heat exchange tubes 254 are located in the cavity of the housing 259 at an elevation between the elevation of the cool air inlet 255 and an elevation of the warmed air outlet 256.

The system 1000 of the present invention can be used to remove heat from any pool of water. In particular, it can be used to reject the decay heat from a spent fuel pool. Because the inventive system 1000 does not require any external active components such as pumps, motors, or electric actuators/controllers, it can engineered as an autonomous system that is not reliant on an external energy source to function. Thus, the inventive system 1000 is safe from an extreme environmental event such as a tsunami. It is evident that several of the systems 1000 can be deployed in a single pool of liquid if desired.

The inventive system 1000 can be retrofit to existing plants for use both as an emergency cooling system under station blackout scenarios and as an auxiliary system to provide operational flexibility during corrective and elective maintenance (particularly during outages). The inventive system 1000 can also be incorporated into the plant design for new build projects to operate as the primary cooling system, thereby removing station blackout as a possible threat to spent fuel pool safety.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An autonomous self-powered system for cooling radioactive materials, the system comprising:
   a pool of liquid including radioactive materials comprised of spent nuclear fuel immersed in the pool of liquid;
   a closed-loop fluid circuit comprising a working fluid having a boiling temperature that is less than a boiling temperature of the liquid of the pool, the closed-loop fluid circuit comprising, in operable fluid coupling, a hydraulic pump, an evaporative heat exchanger having a tube bundle comprising a plurality of heat exchange tubes at least partially immersed in the liquid of the pool in which an outside of the heat exchange tubes is in direct contact with the liquid of the pool, a turbogenerator, and a condenser in which the working fluid flows therebetween;

the closed-loop fluid circuit converting thermal energy extracted from the liquid of the pool into electrical energy in accordance with the Rankine Cycle, the electrical energy powering the pump;

wherein the working fluid flows through the tubeside of the plurality heat exchange tubes inside the heat exchange tubes and operates to absorb heat from the pool of liquid, the working fluid inside the tubes being fluidly isolated from the liquid in the pool;

wherein the condenser is an induced-flow air-cooled condenser that comprises a housing defining a bottom cool air inlet, a top warmed air outlet at a top, and a blower disposed in the warm air outlet, the blower operably coupled to the air-cooled condenser to draw cool air vertically upwards through the housing from the bottom cool air inlet, over heat exchange tubes disposed in the housing below the blower, and discharge heated air through the top warmed air outlet of the housing, the working fluid being a tube-side fluid flowing vertically downwards through the heat exchange tubes of the air-cooled condenser, wherein the air flows in a first vertical direction from the bottom cool air inlet to the top warmed air outlet and the working fluid flows in a second vertical direction through the heat exchange tubes, the second vertical direction being opposite to the first vertical direction;

wherein the air-cooled condenser includes a horizontal working fluid inlet header comprising a first plurality of concentrically arranged toroidal tubes and a horizontal working fluid outlet header comprising a second plurality of concentrically arranged toroidal tubes, the inlet and outlet headers spaced vertically apart in the housing and fluidly coupled to the closed-loop fluid circuit;

wherein the heat exchange tubes of the air-cooled condenser are straight tubes each having a first end coupled to the toroidal tubes of the horizontal working fluid inlet header and an opposite second end coupled to the toroidal tubes of the horizontal working fluid outlet header, the heat exchange tubes each being vertically oriented and extending in a vertical direction between the horizontal working fluid inlet and outlet headers, and wherein the vapor phase of the working fluid enters the air-cooled condenser at an inlet and the liquid phase of the working fluid exits the air-cooled condenser at an outlet, wherein the inlet of the air-cooled condenser is located at a greater elevation than the outlet of the air-cooled condenser.

2. The autonomous self-powered system of claim 1 further comprising:

the evaporative heat exchanger converting the working fluid from a liquid phase to a vapor phase by transferring the thermal energy from the liquid of the pool to the working fluid;

the turbogenerator receiving the vapor phase of the working fluid from the evaporative heat exchanger, the turbogenerator generating the electrical energy by extracting energy from the vapor phase of the working fluid flowing through the turbogenerator;

the condenser receiving the vapor phase of the working fluid from the turbogenerator and converting the vapor phase of the working fluid flowing through the condenser back into the liquid phase of the working fluid by removing thermal energy from the working fluid; and the pump electrically coupled to the turbogenerator so as to be powered by the electrical energy generated by the turbogenerator.

3. The autonomous self-powered system of claim 1 wherein the air cooled condenser further comprises a shroud forming a cavity, the heat exchange tubes located within the cavity of the shroud, the shroud having an air inlet for introducing cool air into the cavity and an air outlet for allowing heated air to exit the cavity, the heat exchange tubes located at an elevation between an elevation of the air inlet and an elevation of the air outlet so that thermal energy transferred from the working fluid flowing to the air through the heat exchange tubes causes a natural convective air flow within the shroud.

4. The autonomous self-powered system of claim 1 wherein the pump forces a liquid phase of the working fluid into the evaporative heat exchanger.

5. The autonomous self-powered system of claim 4 further comprising a reservoir of the liquid phase of the working fluid, the closed-loop fluid circuit comprising the reservoir, and the reservoir located upstream of the hydraulic pump and downstream of the condenser.

6. The autonomous self-powered system of claim 1 wherein the pool of the liquid is at a first pressure and the working fluid within the evaporative heat exchanger is at a second pressure that is greater than the first pressure, the boiling temperature of the working fluid at the second pressure being less than the boiling temperature of the liquid of the pool at the first pressure.

7. The autonomous self-powered system of claim 6 wherein the first pressure is atmospheric and the second pressure is in a range of 250 psia to 400 psia.

8. The autonomous self-powered system of claim 1 wherein the liquid of the pool is water and the working fluid is selected from a group consisting of a refrigerant and a hydrocarbon.

9. The autonomous self-powered system of claim 1 wherein the evaporative heat exchanger is fully immersed in the liquid of the pool and located at a top portion of the pool.

10. The autonomous self-powered system of claim 1 further comprising a rechargeable electrical energy source coupled to the turbogenerator so as to be charged by the electrical energy generated by the turbogenerator.

11. The autonomous self-powered system of claim 1 wherein the evaporative heat exchanger is configured to achieve an internal thermosiphon flow of a liquid phase of the working fluid within the evaporative heat exchanger.

12. The autonomous self-powered system of claim 1 wherein the autonomous self-powered system operates free of electrical energy generated outside of the Rankine Cycle of the closed-loop fluid circuit.

13. The autonomous self-powered system of claim 1 further comprising one or more racks immersed in the pool of liquid, and wherein the radioactive materials comprise spent nuclear fuel rods supported in the one or more racks.

14. The autonomous self-powered system of claim 1 wherein the Rankine Cycle is an Organic Rankine Cycle.

15. A method of cooling a pool of liquid heated by radioactive materials comprising:

flowing a working fluid having a boiling temperature that is less than a boiling temperature of the liquid of the pool through a closed-loop fluid circuit that, in accordance with the Rankine Cycle: (1) extracts thermal energy from the liquid of the pool into the working fluid; (2) converts a first portion of the extracted thermal energy into electrical energy that is used to power a hydraulic pump that forces flow of the working fluid through the closed-loop fluid circuit; and (3) transfers a second portion of the extracted thermal energy to a secondary fluid;

wherein the radioactive materials are comprised of spent nuclear fuel immersed in the pool of liquid;

wherein thermal energy is extracted from the liquid of the pool into the working fluid by an evaporative heat exchanger having a tube bundle comprising a plurality of heat exchange tubes at least partially immersed in the liquid in which an outside of the heat exchange tubes is in direct contact with the liquid of the pool;

wherein the working fluid flows through the tubeside of the plurality heat exchange tubes inside the heat exchange tubes and operates to absorb heat from the pool of liquid, the working fluid inside the tubes being fluidly isolated from the liquid in the pool;

wherein the second portion of the extracted thermal energy is transferred to air by an induced-flow air-cooled condenser;

wherein the induced-flow air-cooled condenser comprises a housing defining a bottom cool air inlet, a top warmed air outlet at a top, and a blower disposed in the warm air outlet, the blower operably coupled to the air-cooled condenser to draw cool air vertically upwards through the housing from the bottom cool air inlet, over heat exchange tubes disposed in the housing below the blower, and discharge heated air through the top warmed air outlet of the housing, the working fluid being a tube-side fluid flowing vertically downwards through the heat exchange tubes of the air-cooled condenser, wherein the air flows in a first vertical direction from the bottom cool air inlet to the top warmed air outlet and the working fluid flows in a second vertical direction through the heat exchange tubes, the second vertical direction being opposite to the first vertical direction;

wherein the working fluid in the air-cooled condenser flows in toroidal path via a horizontal working fluid inlet header comprising a first plurality of concentrically arranged toroidal tubes and a horizontal working fluid outlet header comprising a second plurality of concentrically arranged toroidal tubes, the inlet and outlet headers spaced vertically apart in the housing, the inlet and outlet headers fluidly coupled to closed-loop fluid circuit;

wherein the heat exchange tubes of the air-cooled condenser are straight tubes each having a first end coupled to the horizontal working fluid inlet header and an opposite second end coupled to the horizontal working fluid outlet header, the heat exchange tubes each being vertically oriented and extending in a vertical direction between the horizontal working fluid inlet and outlet headers, and wherein the vapor phase of the working fluid enters the air-cooled condenser at an inlet and the liquid phase of the working fluid exits the air-cooled condenser at an outlet, wherein the inlet of the air-cooled condenser is located at a greater elevation than the outlet of the air-cooled condenser.

16. The method of claim 15 wherein the evaporative heat exchanger converts the working fluid from a liquid phase to a vapor phase, and is immersed in the liquid of the pool.

17. The method of claim 15 wherein the first portion of the extracted thermal energy is converted into the electrical energy by a turbogenerator that is electrically coupled to the pump.

18. The method of claim 15 wherein the flow of the working fluid through the closed-loop circuit is achieved independent of any electrical energy other than that generated by the Rankine Cycle of the closed-loop fluid circuit.

* * * * *